July 10, 1962  G. H. BINGHAM, JR., ET AL  3,042,975
WELT IN SHOES WITH MOLDED SOLES
Filed Aug. 26, 1960  2 Sheets-Sheet 1

INVENTORS
George H. Bingham, Jr.
Otto Y. Olsson
by Roberts, Cushman & Grover
ATT'YS 3,042,975
WELT IN SHOES WITH MOLDED SOLES
George H. Bingham, Jr., Westminster, and Otto Y. Olsson, Taneytown, Md., assignors to Cambridge Rubber Company, Taneytown, Md., a corporation of Maryland
Filed Aug. 26, 1960, Ser. No. 52,077
5 Claims. (Cl. 18—59)

This invention relates to shoes and more particularly to shoes having a welt on a molded outersole.

In one method of making shoes an assembled upper is placed on a last and a rubber sole is molded in place to the upper. Welts have been molded into the upper utilizing a strip of vulcanizable material of a color different from the body of the outersole. However previous methods have occasionally resulted in welt material flowing over the edge of the outer sole and up onto portions of the upper resulting in the production of unsightly seconds of diminished value.

It is accordingly the principal object of this invention to provide an improved method of providing a welt on molded outersoles which substantially avoids the foregoing difficulty. Further objects include the provision of inexpensible welts which can be reliably provided by unskilled labor. Other and further objects and advantages will be apparent from the following more detailed description and by reference to the accompanying drawings wherein.

Figure 1:
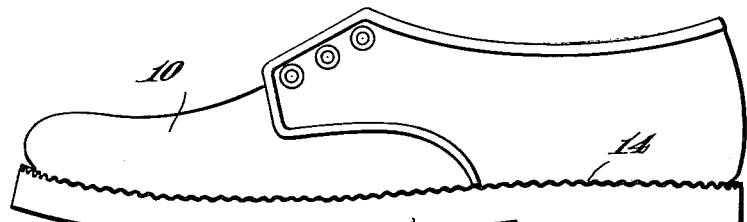
FIG. 1 is a side elevation of a shoe having an outersole of molded rubber and having a welt according to this invention.

Referring to FIG. 1, the shoes according to this invention comprise an upper 10, of any desired material but often of fabric, and a molded rubber outersole 12 having a corrugated peripheral strip 14 of rubber of a different color to constitute a welt. While any desired colors can be employed, the outer sole 12 is usually brown or black and the welt strip 14 white. Also the upper 10 is usually of a color contrasting with that of the welt.

Figure 5:
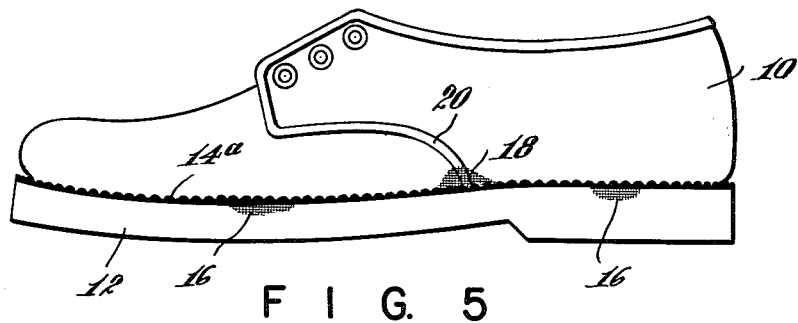
FIG. 5 is a view similar to FIG. 1 illustrating defects resulting from prior methods.
Figure 6:
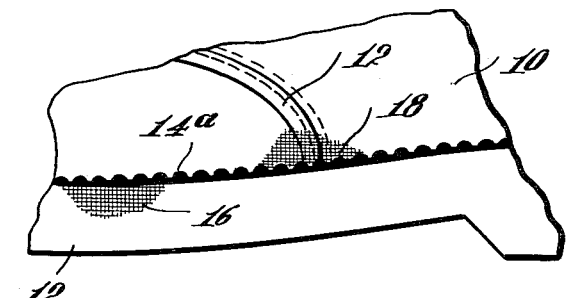
FIG. 6 is a partial enlarged side view of the middle portion of the shoe shown in FIG. 5.

Welts have been heretofore made by applying a relatively heavy strip of soft flowable rubber to a sole blank cut from a sheet of incompletely vulcanized rubber sole stock, followed by formation of transverse corrugations in the vulcanizable welt strip with a toothed wheel or the like. This blank was then molded to the upper. However this procedure occasionally produces defects as illustrated in FIGS. 5 and 6. Since the ribbon stock is thick and relatively soft and flowable, usually susceptible to greater flow under shoe sole molding temperatures and pressures than the sole stock, the welt ribbon flows down over the side edge of sole 12 to provide discolored areas 16 on the outersole edge. Similarly, the ribbon stock will sometimes flow upwardly onto areas of the upper 10 to give further discolored areas 18. This is especially prevalent at areas adjacent seams 20 in the upper which prevent a tight pressure seal between the last and the mold during vulcanization. However such upper discolorations can occur at other locations since the mold does not always follow precisely the complex mating curvature of the last. It should also be noted that the prior welts 14a were of such thickness that the transverse corrugations were substantially entirely contained therein so that the outer sole 12 had a substantially smooth upper surface.

Figure 3:
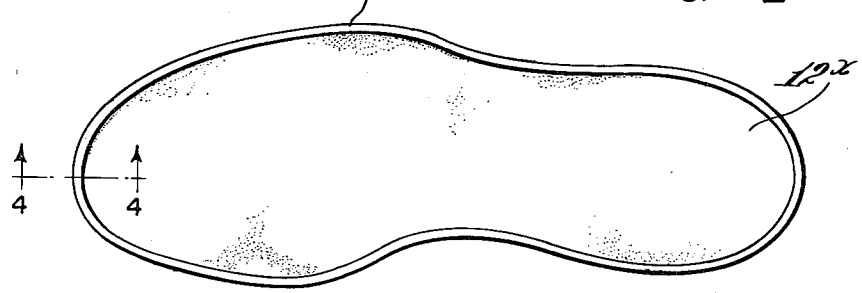
FIG. 3 is a plan view of an unvulcanized sole blank having a peripheral strip of rubber applied thereto.
Figure 4:
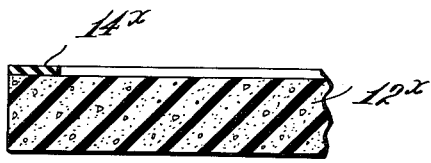
FIG. 4 is an enlarged section on the line 4—4 of FIG. 3.

It has now been discovered that satisfactory welts can be provided without unsightly discolorations by utilizing a narrow, relatively thin strip 14x (FIGS. 3 and 4) of rubber welt stock which is substantially non-flowable at sole-molding temperatures and pressures. Such strip should be approximately 1/16 of an inch in thickness and approximately the desired welt width, and should be applied to, but not overhanging the upper peripheral edge of the sole blank 12x (FIGS. 3 and 4). Blank 12x is usually of sufficient tack to hold strip 14x in place, but if not, it can be provided with a tacky adhesive. This welt is then provided with corrugations during the molding operaiton, and not by toothed wheels or the like, as will now be explained.

Figure 7:
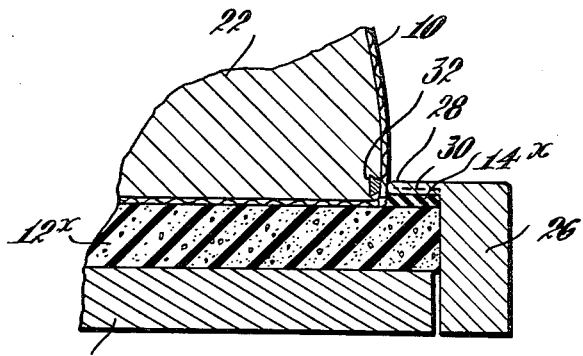
FIG. 7 is a partial transverse section of molding apparatus useful in making the shoes shown in FIG. 1.

FIG. 7 illustrates, in section, molding apparatus useful in molding the outer sole and simultaneously forming corrugated welt 14. The apparatus comprises a last 22, usually of metal, a bottom plate 24 mounted for movement up and down, and a ring mold member 26 extending around the periphery of the last and having an inwardly projecting, overhanging flange 28 at its upper edge. Ring member 26 is split diametrically and each part is mounted for movement toward and away from last 22. The underside of flange 28 is provided with corrugations 30 which form the corrugations in the upper surface of welt strip 14. Preferably, the last 22 is provided with an insert 32 of lead or the like adjacent the inner edge of flange 28 so that it will yield to the presence of the mold. This insert compensates for misalignment of mating mold and last surfaces and, more especially, for variations in the thickness of the upper 10 such as at seam 20. While this insert 32 can be provided only at selected areas, it preferably circumscribes the last opposite the inner edge of flange 28. This mold apparatus, excepting for insert 32 and corrugation 30, is more fully described in my copending application Serial No. 22,048, filed April 13, 1960.

In molding, the sole blank 12x, die-cut from suitable stock and having strip 14x applied, is placed on bottom plate 24, an upper placed on last 22, and ring member 26 closed to embrace the lasted upper 10. Bottom plate 24 is then forced upwardly and heat applied to simultaneously mold and vulcanize the parts together and to form welt corrugations in strip 14x.

Figure 2:
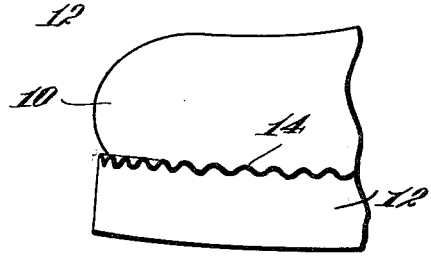
FIG. 2 is an enlarged side view of the toe portion of the shoe of FIG. 1.

Preferably, and as shown in FIGS. 1 and 2, welt strip 14 is of such thickness, and without substantial flow, that the welt corrugations are substantially molded into the upper surface of sole blank 12x simultaneously with their formation in strip 14x so that the finished strip or ribbon 14 is of substantially uniform thickness.

Ribbon stock 14x which is vulcanizable but of substantially no flow at sole-molding temperature and pressures can be obtained on specification from rubber manufacturers. It can constitute, for example, rubber partially vulcanized so as to be capable of further vulcanization for bonding to sole 12, but vulcanized sufficiently to have little or no flow at the prescribed temperature and pressure.

It should be understood that the foregoing description is for the purpose of illustration only and that the invention includes all modifications and equivalents falling within the scope of the appended claims.

We claim:

1. The method of applying a welt to a shoe having a rubbery outersole molded to the upper comprising providing a mold having a last for an upper, a bottom plate and peripheral ring member circumscribing the outersole and having an overhanging peripheral projecting with transverse corrugations on its underside, applying a ribbon of vulcanizable rubber of one color to the edge of an outersole blank of vulcanizable rubber of another color, said ribbon being applied to but not beyond the peripheral edge of said blank and being substantially nonflowable at shoe-sole molding temperatures and pressures, placing said ribbon and blank in the mold with an upper, and molding said upper and ribbon to said outersole under heat and pressure.

2. The method according to claim 1 wherein said ribbon is sufficiently thin that the transverse welt corrugations are simultaneously molded into the upper edge of said outersole blank, the molded ribbon being corrugated but of approximately uniform thickness.

3. The method according to claim 2 wherein said ribbon is about 1/16" thick and 1/8" wide.

4. The method according to claim 1 wherein said last has an insert of lead-like softness opposite the inner edge of said overhanging projection.

5. The method according to claim 4 wherein said insert circumscribes said last opposite said projection.

References Cited in the file of this patent

FOREIGN PATENTS

| | | |
|---|---|---|
| 797,746 | Great Britain | July 9, 1958 |
| 490,227 | Italy | Feb. 6, 1954 |